UNITED STATES PATENT OFFICE 2,493,327

AQUEOUS COMPOSITION FOR TREATING IRON AND STEEL

Donald W. Vance, Pasadena, Calif., assignor to Kelite Products, Inc., Los Angeles, Calif., a corporation of California No Drawing. Application September 27, 1946, Serial No. 699,643

1 Claim. (Cl. 148—6.15)

This invention relates to a composition for treating iron and steel. The composition of the present invention operates on iron and steel to remove rust from the iron and steel and when applied operates to prevent subsequent rust during storage. Furthermore, the composition of the present invention prepares the surface of the iron and steel to provide a better bond for a paint coating.

While the composition of the present invention has some rust-removable properties, by far its greater value resides in its rust-preventing action and in its action in facilitating the bond of paint to iron and steel.

The composition of the present invention has a great advantage over compositions in general use for treating iron and steel in that the compositions now in use for preventing rusting of iron and steel and facilitating a paint bond in a "proper operation must be applied hot," whereas the composition of the present invention may be applied hot or cold and operates with better results when applied cold. The composition of the present invention is accordingly of great value for use in production line work. In certain production line operation, such as the production of automobiles, it is desirable to treat iron or steel for the prevention of rust and to facilitate paint bond. Where this treatment must be carried on using hot solutions, the expense of the treatment is greatly in excess of that arising from the use of the composition of the present invention.

The composition of the present invention comprises essentially an aqueous solution of phosphoric acid and formic acid which is substantially, or nearly, saturated with zinc. Aqueous solutions containing a mixture of phosphoric and formic acids (containing no zinc) will slowly but continuously dissolve iron or steel, but I have discovered that by dissolving in solution a small amount of zinc the action of the solution on iron and steel appears to be confined to a removal of rust and in the formation of some compound which is effective in preventing subsequent rust; and moreover the attack of the acid on the metal is checked.

By immersing the iron and steel members to be treated in a solution of the composition of the present invention after a short time of treatment such as 3 to 5 minutes the color of the iron or steel is visibly changed from a rust or red appearance to a bluish cast. Longer periods of immersion have substantially no effect on the object treated. When the composition is dried on the iron or steel members treated, rust prevention continues over long periods of time.

The exact theoretical explanation for the action of the composition of the present invention on iron and steel is not fully understood but it is believed that there are formed in solution certain zinc-formic-phosphoric compounds which become deposited as very thin coatings on the surface of the iron or steel to be treated, and thereby act to protect the iron and steel from rust.

While the composition of the present invention may be formed simply by the addition of water to phosphoric acid, formic acid and zinc, there may be included in the composition various additional ingredients. Thus, for example, it may be desirable to add a wetting agent such as any usual or preferred wetting agent to facilitate the action of the composition. Usual wetting agents are the aryl alkyl sulfonates or the alkyl sulfate compounds. It may also be desirable to include an organic solvent to assist the action of the composition in acting upon any oil or grease which may be present on the surface of the iron or steel to be treated.

While I have hereafter described what I believe to be the preferred form of the composition of the present invention, it will be apparent to those skilled in the art that various modifications may be made in the example given. The preferred composition of the present invention includes, on a percentage of weight basis, 73.7% phosphoric acid ($H_3PO_4$), 6.0% formic acid, 0.25% zinc, 9.45% solvent (such as ethlyene glycol monobutyl ether), 10.1% water, and 0.5% wetting agent (aryl alkyl sulfonate).

The percentages above given are used for making up the composition and in this form the composition is believed to be nearly saturated with zinc. When used for treating steel, the composition is generally diluted so that the composition as used contains between 10% and 25% by weight of the concentrated preparation by the addition of water. Accordingly the composition as used for treating steel contains from 7.4 to 18.4% phosphoric acid; from 0.6 to 1.5% formic acid; from 0.025 to 0.06% zinc; from 0.9 to 2.4% ethylene glycol monobutyl ether; from 91.0 to 77.5% $H_2O$, and from 0.05 to 0.12% alkyl aryl sulfonate wetting agent.

The treatment of the iron and steel consists in merely the immersion of the article to be treated in the composition for a period of time which is not necessarily extended over 5 minutes, 2 or 3 minutes being adequate in most cases.

To illustrate the efficiency of the composition of the present invention in the treatment of iron and steel, test treatments have been performed with these rust-resisting properties on steel plates in an accelerated salt spray test. In these tests the samples of the untreated steel plates showed evidence of rusting within from 50 minutes to 1 hour and 20 minutes treatment. Samples of the same steel plates, when treated with 10% solution of the composition of the present invention at room temperature, resisted rusting under the test over a period of time varying from 5 hours and 20 minutes to 24 hours and 20 minutes with different specimens treated. By increasing the percentage of the composition used in the treatment to 25% the specimen resisted rusting or corrosion for periods of over 30 hours. To illustrate the effect of temperature in the treating using the composition of the present invention, specimens were hot treated using the 25% solution and these specimens resisted corrosion only from between 8 hours and 20 minutes and 28 hours and 20 minutes, depending upon the particular specimen treated.

It will be seen from the foregoing test data that the cold treatment is superior to the hot treatment and that the rust-prevention properties are increased with the percentage of the composition employed. For ordinary treatment I believe that a 15% solution is adequate for treatment.

After immersing the article in the aqueous solution of the composition, it should be removed and the adhering solution dried onto the article, such as by air drying.

While the particular form of the composition herein described is well adapted for carrying out the objects of the present invention, it is to be understood that various modifications and changes may be made, and this invention includes all such modifications and changes as come within the scope of the appended claim.

I claim:

A composition for treating iron and steel which composition consists of an aqueous solution including phosphoric acid 7.4 to 18.4%; formic acid 0.6 to 1.5%; zinc 0.025 to 0.06%; ethylene glycol monobutyl ether 0.9 to 2.4%; wetting agent 0.05% to 0.12%, and the remainder 91.0 to 77.5% water.

DONALD W. VANCE.

REFERENCES CITED

The following references are of record in the file of this patent:

UNITED STATES PATENTS

| Number | Name | Date |
|---|---|---|
| 1,514,494 | Williams | Nov. 4, 1924 |
| 2,250,508 | Thompson et al. | July 29, 1941 |

FOREIGN PATENTS

| Number | Country | Date |
|---|---|---|
| 375,426 | Germany | May 12, 1923 |